(12) United States Patent
Bradbury et al.

(10) Patent No.: US 9,910,769 B2
(45) Date of Patent: *Mar. 6, 2018

(54) ALIGNMENT BASED BLOCK CONCURRENCY FOR ACCESSING MEMORY

(71) Applicant: INTERNATIONAL BUSINESS MACHINES CORPORATION, Armonk, NY (US)

(72) Inventors: Jonathan D. Bradbury, Poughkeepsie, NY (US); Michael K. Gschwind, Chappaqua, NY (US); Christian Jacobi, Poughkeepsie, NY (US); Timothy J. Slegel, Staatsburn, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/404,219

(22) Filed: Jan. 12, 2017

(65) Prior Publication Data

US 2017/0123967 A1 May 4, 2017

Related U.S. Application Data

(63) Continuation of application No. 14/560,486, filed on Dec. 4, 2014, now Pat. No. 9,582,413.

(51) Int. Cl.
*G06F 12/02* (2006.01)
*G06F 12/06* (2006.01)
(Continued)

(52) U.S. Cl.
CPC .......... *G06F 12/023* (2013.01); *G06F 9/3004* (2013.01); *G06F 9/30036* (2013.01);
(Continued)

(58) Field of Classification Search
None
See application file for complete search history.

(56) References Cited

U.S. PATENT DOCUMENTS

| | | |
|---|---|---|
| 6,425,020 B1 | 7/2002 | Sharma |
| 2006/0112226 A1* | 5/2006 | Hady .................... G06F 15/167 711/130 |

(Continued)

OTHER PUBLICATIONS

Power ISA Version 2.06, Rev. B, published Jul. 23, 2010 by IBM.*

(Continued)

*Primary Examiner* — Duc Doan
(74) *Attorney, Agent, or Firm* — Cantor Colburn LLP; Steven Chiu

(57) ABSTRACT

Embodiments relate to accessing data in a memory. A method for accessing data in a memory coupled to a processor is provided. The method receives a memory reference instruction for accessing data of a first size at an address in the memory. The method determines an alignment size of the address in the memory. The method accesses the data of the first size in one or more groups of data by accessing each group of data block concurrently. The groups of data have sizes that are multiples of the alignment size.

9 Claims, 5 Drawing Sheets

(51) Int. Cl.
    *G06F 13/16*     (2006.01)
    *G06F 9/30*     (2018.01)
    *G06F 9/38*     (2018.01)

(52) U.S. Cl.
    CPC ........ *G06F 9/30043* (2013.01); *G06F 9/3824* (2013.01); *G06F 12/0646* (2013.01); *G06F 13/1652* (2013.01); *G06F 2212/1044* (2013.01); *G06F 2212/251* (2013.01); *G06F 2212/656* (2013.01)

(56) References Cited

U.S. PATENT DOCUMENTS

| | | | |
|---|---|---|---|
| 2008/0307187 A1* | 12/2008 | Schopp | G06F 12/023 711/171 |
| 2010/0262781 A1* | 10/2010 | Hrusecky | G06F 9/30043 711/119 |
| 2016/0162400 A1 | 6/2016 | Bradbury et al. | |
| 2016/0162401 A1 | 6/2016 | Bradbury et al. | |

OTHER PUBLICATIONS

Counting, Wlkepedia 2014.*
Binary Number, Wikipedia 2014.*
Mott, JM et al, Asynchronous Queued I/O Processor Architecture, IBM Technical Disclosure Bulletin 1993.*
List of IBM Patents or Paten Applications Treated as Related; Date Filed: Jan. 12, 2017, pp. 1-2.

* cited by examiner

ALIGNMENT BASED BLOCK CONCURRENCY FOR ACCESSING MEMORY

DOMESTIC PRIORITY CLAIM

This application is a continuation of U.S. patent application Ser. No. 14/560,486, filed Dec. 4, 2014, the disclosure of which is incorporated by reference herein in its entirety.

BACKGROUND

The present invention relates generally to accessing a memory by a processor, and more specifically, to accessing a block of data in a memory atomically or block concurrently by a processor.

Scalar code expects that a central processing unit (CPU) executing the code will access all of the bytes of a software variable together. In a typical architecture for CPUs, such expectation is met for a scalar code as long as the access is performed on a boundary in a memory that is an integer multiple of the size of the data being accessed. When a scalar code is vectorized by a compiler, the load and store instructions are often converted to vector load and store instructions. However, a vector load instruction and a vector store instruction often have no consistency guarantees, or consistency is guaranteed only if the vector load or store instruction is on a boundary that is the size of the vector register in a CPU. For accesses which are not atomic or block concurrent, if one CPU writes out data and another CPU reads data at the same time, the CPU reading the data may see partial updates to the memory locations containing the latter CPU's variables. This is not consistent with the semantics of most programming languages, or programming techniques such as lock-free data structures.

SUMMARY

Embodiments include methods, systems, and computer program products for accessing data in a memory. According to an embodiment of the present invention, a method for accessing data in a memory coupled to a processor is provided. The method receives a memory reference instruction for accessing data of a first size at an address in the memory. The method determines an alignment size of the address. The method accesses the data of the first size in one or more groups of data by accessing each group of data block concurrently. The groups of data have sizes that are multiples of the alignment size.

According to another embodiment of the present invention, a system for accessing data is provided. The system comprises a memory and a processor configured to perform a method. The method receives a memory reference instruction for accessing data of a first size at an address in the memory. The method determines an alignment size of the address. The method accesses the data of the first size in one or more groups of data by accessing each group of data block concurrently. The groups of data have sizes that are multiples of the alignment size.

According to a further embodiment of the present invention, a computer program product for accessing data in a memory is provided. The computer program product comprises a computer readable storage medium having machine instructions embodied therewith. The machine instructions readable by a processor cause the processor to perform a method. The method receives a memory reference instruction for accessing data of a first size at an address in the memory. The method determines an alignment size of the address. The method accesses the data of the first size in one or more groups of data by accessing each group of data block concurrently. The groups of data have sizes that are multiples of the alignment size.

According to a further embodiment of the present invention, a system for accessing data is provided. The system comprises a memory and a processor configured to perform a method. The method receives a memory reference instruction for accessing data of a first size at an address in the memory. The memory reference instruction specifies the first size. The method determines an alignment size of the address. The method determines a greatest common divisor of the first size and the determined alignment size. The method accesses the data of the first size in one or more groups of data. The groups of data have sizes that are multiples of a size of the greatest common divisor.

According to a further embodiment of the present invention, a computer program product for accessing data in a memory is provided. The computer program product comprises a computer readable storage medium having machine instructions embodied therewith. The machine instructions readable by a processor cause the processor to perform a method. The method receives a memory reference instruction for accessing data of a first size at an address in the memory. The memory reference instruction specifies the first size. The method determines an alignment size of the address. The method determines a greatest common divisor of the first size and the determined alignment size. The method accesses the data of the first size in one or more groups of data. The groups of data have sizes that are multiples of a size of the greatest common divisor.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
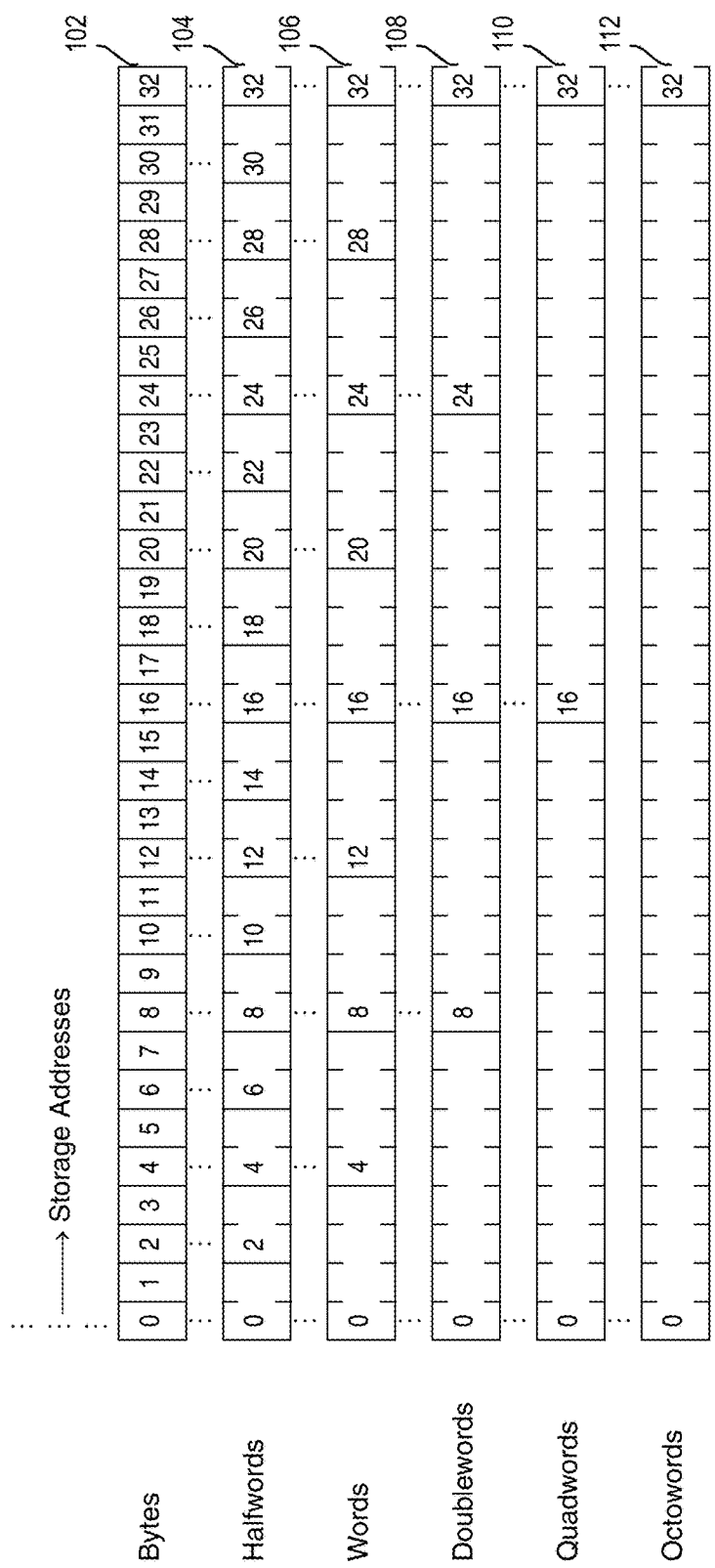
FIG. 1 illustrates portions of a memory having blocks that are naturally aligned in accordance with some embodiments of the invention.

Some programming language conventions require all bytes of a block of data (e.g., a natively typed variable such as an integer, a float, a long, a double, etc.) in a memory to be accessed concurrently by a processor (e.g., a central processing unit (CPU)). The bytes of a block being accessed concurrently means that either an original value or an updated value is accessed, and no mixture of the two values is to be accessed. For example, when a block of data has a value "1234" and the value is being updated to "5678", only one of these two values is a correct value to fetch. Any partially updated value (e.g., "1278" or "5634") that may result from accessing the block of data not concurrently is an incorrect value to fetch. This concurrent access requirement is referred to as "block concurrency" in this disclosure. Also, accessing a memory "block concurrently" or "block concurrent" means that a manner in which data in a memory is accessed meets block concurrency. For conventional programming languages and processors, block concurrent access for a block of data is guaranteed only when the block is "naturally aligned", i.e., when the address of the block corresponds to a multiple of the data type size of the block.

Special names are given to fields of 2, 4, 8, 16, and 32 bytes. A halfword is a group of two consecutive bytes. A word is a group of four consecutive bytes. A doubleword is a group of eight consecutive bytes. A quadword is a group of 16 consecutive bytes. An octoword is a group of 32 consecutive bytes. When memory addresses designate "naturally aligned" halfwords, words, doublewords, quadwords, and octowords, the binary representation of the address contains one, two, three, four, or five rightmost zero bits, respectively. The halfword, word, doubleword, or quadword is referred to in this disclosure as a block.

For some instructions that reference data in a memory, the accesses to all bytes within a halfword, word, doubleword, or quadword are specified to appear to be block concurrent as observed by other processors and channel programs. When a fetch-type reference is specified to appear to be concurrent within a block, no store access to the block by another processor or channel program is permitted during the time that bytes contained in the block are being fetched by one processor. When a store-type reference is specified to appear to be concurrent within a block, no access to the block, neither fetch-type or store-type, is permitted by another processor or channel program during the time that the bytes within the block are being stored by one processor. In accordance with conventional instruction set architecture, single operand references (e.g., a single value loaded to a single register, or a single operand used by an instruction) have block concurrency corresponding to that operand size (i.e., the size of data being accessed) if the address specified in the operand is at an integral boundary. If the address specified in the operand is not at an integral boundary, the operand is block concurrent corresponding to one byte size only.

For conventional processors, all eight bits of a byte are always referenced together —this is referred to as byte concurrency. Block concurrency, therefore, represents different levels of byte concurrency. For example, block concurrency for a four-byte data block can be referred to as four-byte concurrency. Moreover, because all four bytes of a four-byte data block are accessed concurrently as a single unit when the memory is accessed with four-byte concurrency, the two two-byte data blocks and the four one-byte data blocks are two-byte concurrent and byte concurrent, respectively.

Block concurrent memory operations are also referred to as atomic operations with regard to memory references. A memory reference is considered block concurrent if all bytes within an integral block are accessed as a single unit as seen by other processors. An integral block is a block of data, of which an address is an integer multiple of the block's length. An integral block is on an integral boundary—the address of the first byte of the block is at an integral boundary.

FIG. 1 illustrates portions of a memory with addresses that designate "naturally aligned" blocks. Specifically, this figure depicts bars 102-112 that represent "naturally aligned" halfwords, words, doublewords, quadwords and octowords, respectively. As illustrated, a memory is viewed as a long horizontal string of bits. The string of bits is subdivided into units of byte (i.e., eight bits). Each byte location in a memory is identified by a unique nonnegative integer, which is the address of that byte location.

The bar 102 represents a memory having blocks of one-byte data. Each rectangle in the bar 102 represents a block of one-byte data. The number included in each rectangle is the offset of the byte block from the base address (corresponding to the address of the first element labelled with offset 0). Each byte can be accessed (i.e., fetched from or stored to the memory) using the address and offset therefrom. In some embodiments, a memory is block concurrently accessed at least at the byte level (i.e., byte concurrent). In addition, if the address of the first byte of data being accessed is an integral boundary for a larger block size, then accesses to larger blocks can be similarly block concurrent with respect to that block size.

The bar 104 represents a memory having blocks of two-byte data that are naturally aligned. Each of the two-byte blocks is addressed with a multiple of two, and thus all of the two-byte data blocks are integral blocks, and can be accessed block concurrently with a block size of two bytes. Likewise, the four-byte data blocks in the bar 106, the eight-byte data blocks in the bar 108, the 16-byte data blocks in the bar 110, and the 32-byte data blocks in the bar 112 are all integral blocks, and accessed to those data blocks can be performed block concurrently with respect to four byte, eight byte, 16 byte and 32 byte blocks.

In this disclosure, an address alignment size of a memory address is the size of the largest integral block that is addressable by that address, i.e., the largest power of two divisor of the address. For instance, the address alignment size of an address 96 is 32 (i.e., $2^5$) and the address alignment size of an address 64 is 64 (i.e., $2^6$). In some embodiments, the address alignment size for an address is obtained by counting the trailing zeros of an address in binary representation, and then raising two to the power of trailing zeros in binary representation, i.e., alignment_size (address)=$2^{trailing\_zeros(address)}$, where alignment_size( ) is a function that takes an address as input and outputs the address alignment size of the input address, and trailing_zeros( ) is a function that takes the address as input and outputs the number of trailing zeros in the address in binary representation. For instance, an address 96 is $1100000_2$, which has five trailing zeros. The address alignment size of an address 96 is therefore $2^5$ or 32. An address 64 is $1000000_2$, which has six trailing zeros. The address alignment size of an address 64 is therefore is $2^6$ or 64.

For a conventional memory reference instruction, block concurrency depends on whether the address of the first byte of a block of data being referenced is integral to the memory reference size (i.e., whether the address of the first byte is a multiple of the memory reference size, or the address alignment size is equal or larger than the memory reference size). That is, block concurrency for a conventional memory reference instruction depends on whether the block of data being referenced by the instruction has an address alignment size that is the same as the memory reference size. For example, if a conventional memory reference instruction references eight bytes of data on an eight-byte integral boundary (e.g., addresses 0, 8, 16, 24, and so forth shown in the portion of a memory represented by the bar 108), it is eight-byte concurrent. However, if a conventional memory reference instruction references eight bytes of data on a four-byte integral boundary (e.g., addresses 4, 12, 20, etc. shown in the portion of a memory represented by the bar 106), eight-byte concurrency is not guaranteed. This is because when a conventional memory reference instruction references an eight-byte block of data in a memory aligned at four-byte boundaries, it is not guaranteed that the two four-byte blocks or the four two-byte blocks will not be updated by another processor while one processor is referencing the eight bytes.

When the address of the block of data being referenced is not integral to the memory reference size of an instruction that references the block, conventional instruction set architectures guarantee only single byte concurrency for such a memory reference, such as for loading to or storing from a single register, that provides one operand from memory to an instruction that expects a memory operand, and so forth. As such, software can only rely on a conventional memory reference that provides block concurrency at the memory reference size or just single-byte concurrency. No intermediate level of block concurrency is guaranteed by memory reference instructions in accordance with conventional instruction set architectures. That is, for example, when the memory reference size is eight bytes and the block of data being referenced is aligned at a four-byte boundary or a two-byte boundary, only single byte concurrency (i.e., block concurrency with a block size of one byte) is provided because eight-byte concurrency is only provided for eight byte (double word) references on an integral eight byte memory addresses (i.e., when the address is a multiple of the eight byte data size) or single-byte concurrency is guaranteed otherwise.

In modern processors, accesses for wide data references (e.g., a double word, a quadword, or an octoword) can commonly be executed at the same speed as references to smaller data sizes. Thus, when a larger memory area is to be accessed, processed, or copied, it is desirable to access, process or copy a large region with memory instructions adapted to access, process and/or copy memory using larger memory reference sizes. Thus, for example, when two consecutive words are to be copied, two word loads and two word stores may be replaced with a single double word load and a single double word store, and thereby doubling the speed of the copy operation. If an array of 32 two-byte variables on a two-byte boundary is to be copied, it would take 32 halfword loads and 32 halfword stores to complete the copy. On a processor implementing double word accesses, a group of four halfword accesses each may be replaced by a single doubleword access.

The embodiments of the invention provide a mechanism for copying a sequence of aligned data (e.g., word) at their integral address (e.g., addresses $100_2$) with block concurrency at the respective individual data element when copying such data using memory references for data sizes (e.g., doubleword sizes—eight bytes) larger than the size of each individual data element (e.g., word size—four bytes) at its respective (data element) integral boundary, and when the first individual data element at its respective (data element) integral boundary (e.g., address $100_2$) is not aligned at the larger data size integral boundary (e.g., address $1000_2$) corresponding to the access size being used to copy a sequence of data elements aligned at their integral boundary.

The embodiments of the invention provide systems and methods that provide different levels of block concurrency even if the address of a block of data being referenced is not integral to the memory reference size. In some embodiments, an operand of an instruction consists of multiple block concurrent accesses, each block corresponding to a block at its corresponding integral boundary. For example, if a memory reference instruction of some embodiments references an eight-byte of data on a four-byte boundary (e.g., address $100_2$ or $1100_2$ shown in the portion of a memory represented by the bar 106), four-byte concurrency for each four byte block aligned at an integral four byte boundary is guaranteed. Moreover, two-byte concurrency is also guaranteed because it is implied by the guaranteed four-byte concurrency (i.e., any block aligned at an integral four byte boundary is also aligned at an integral two byte boundary because four is a multiple of two). Likewise, if a memory reference instruction has a memory reference size of 16-bytes at an address of memory with an eight-byte boundary (e.g., address $1000_2$ or $11000_2$ shown in the portion of a memory represented by the bar 106), eight-byte block concurrency, four-byte block concurrency, two-byte block concurrency and single-byte block concurrency are guaranteed for eight bytes, four bytes, two bytes and one byte blocks aligned at their integral eight byte, four bytes, two bytes and one byte blocks boundary that comprise the 16 bytes block. That is, any eight-, four-, two- or one-byte block on its integral boundary comprising the accessed 16-byte reference size is guaranteed not to include a partially updated value.

The alignment size of the address of the block of data being referenced is only the minimum byte concurrency level that the processors executing the memory reference instructions of some embodiments of the invention provide. That is, in some embodiments, a single block concurrent access may be implemented as a plurality of accesses in conjunction with logic to ensure that the plurality of such accesses exhibit block concurrent behavior. In some embodiments, a plurality of block concurrent accesses are implemented as a single access providing at least block concurrent behavior to each block of said plurality of accesses that is aligned at an integral boundary.

Figure 2:
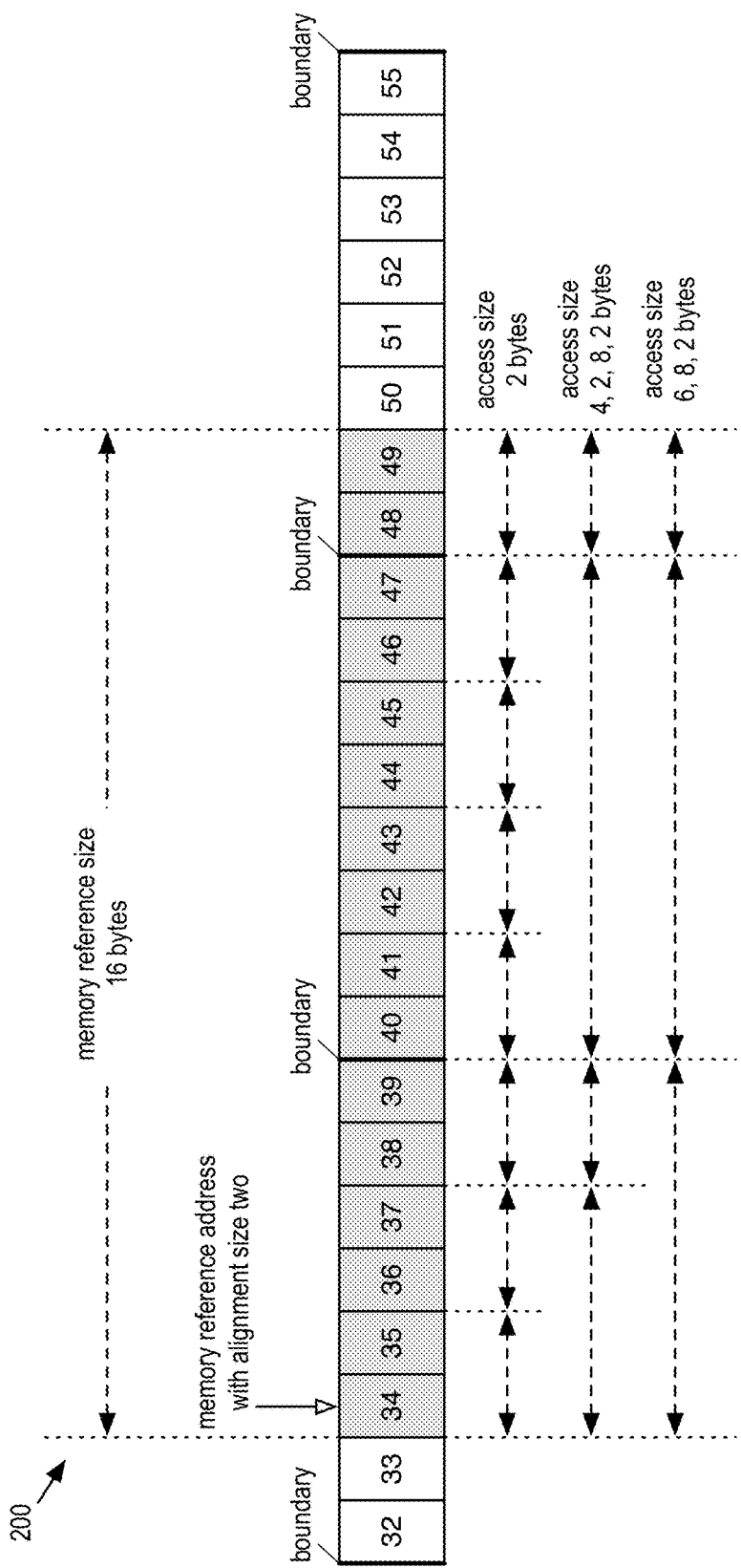
FIG. 2 depicts a portion of a memory accessed in accordance with some embodiments of the invention.

FIG. 2 depicts a portion of a memory 200 accessed by processors according to some embodiments of the invention. Specifically, this figure illustrates a portion of memory with addresses from 32 to 55. The memory 200 has eight-byte boundaries (e.g., cache interface size). That is, addresses 32, 40 and 48 comprise the boundaries.

As an example, a memory reference instruction in accordance with some embodiments of the invention has a memory reference size of 16 bytes (i.e., size of a quadword), and this block of 16 bytes has an address of 34 (i.e., the first byte of the block is at address 34 of the memory 200). These 16 bytes are depicted as gray boxes in FIG. 2. The processor executing this memory reference instruction would access the 16 bytes of data while guaranteeing two-byte concurrency. This is because address 34 in binary form (i.e., $100010_2$) has one trailing zero, and therefore the address has an alignment size of two bytes.

In some embodiments, the processor may access the 16 bytes of data in any sizes of groups that are multiple of the alignment size as long as none of the groups spans across a boundary of the memory. For example, the processor executing the instruction would access four bytes with addresses 34-37, two bytes with addresses 38 and 39, four bytes with addresses 40-43, four bytes with addresses 44-47, and two bytes with addresses 48 and 49. However, because accessing each group takes time and affects performance, the processor executing the instruction would access these 16 bytes of data in as small number of accesses as possible while avoiding crossing the cache lines (i.e., addresses 32, 40, 48 in this example). Specifically, the processor would access the first six bytes with addresses 34-39 up to the cache line address 40, the next eight bytes with addresses 40-47 up to the next cache line address 48, and the next two bytes with addresses 48 and 49. These three accesses (i.e., six-byte access, eight-byte access, and two-byte accesses) may be performed in any order, so as to access all 16 bytes.

In contrast to the processor executing a memory reference instruction in accordance with some embodiments of the invention, a processor executing a conventional memory reference instruction that references 16 bytes of data at address 34 of the memory 200 would access the 16 bytes of data using up to 16 one-byte accesses. This is because, for the conventional memory reference instruction, the address of the 16-byte data is not integral to the memory reference size (i.e., 16 bytes) and therefore only byte concurrency is guaranteed. In some cases, the processor executing the conventional memory reference instruction would have to pad meaningless bytes at byte addresses 32, 33 and 50-55 to access the sixteen bytes with addresses 34-49 without causing alignment fault. These extra steps would affect the performance.

The following code examples are specified based on exemplary instructions according to IBM's z/Architecture unless otherwise noted. However, those skilled in the art will understand how to adapt the examples herein to other architectures, such as the Power ISA architecture. The instruction set of the IBM System z server family, known as the z/Architecture instruction set, is set forth in the IBM publication *z/Architecture Principles of Operation*, SA22-7832-09 (10th ed. September 2012), incorporated herein by reference in its entirety. The instruction set of Power Servers, known as the Power ISA (instruction set architecture), is set forth in *Power ISA* (Version 2.06 Revision B, July 2010), incorporated herein by reference in its entirety.

In the following exemplary z/Architecture instructions (example 1), a copy loop of 16 halfword loads and stores are shown:

```
    LHI R1, 16
    XGR R3, R3
LOOP: LLH R2,0(R3,R4)
    STH R2,0(R3,R5)
    AGHI R3,2
    BCT R1,LOOP
``` where LHI is a LOAD HALFWORD IMMEDIATE instruction, XGR is an EXCLUSIVE OR instruction, LLH is a LOAD LOGICAL HALFWORD instruction, STH is a STORE HALFWORD instruction, AGHI is an ADD HALFWORD IMMEDIATE instruction, BCT is a BRANCH ON COUNT instruction, and R1-R5 are registers. More detailed description of these instructions are described in the above-incorporated *z/Architecture Principles of Operation*.

The 16 halfword loads and stores shown in example 1 may be replaced with four loads and four stores of doublewords registers, reducing the execution time from the time corresponding to executing 66 instructions to the time corresponding to executing 18 instructions as shown in the following example 2:

```
    LHI R1, 4
    XGR R3, R3
LOOP: LG R2,0(R3,R4)
    STG R2,0(R3,R5)
    AGHI R3,8
    BCT R1,LOOP
```

However, example 1 that is based on copying 16 halfwords offers two byte block concurrency if the addresses held in registers R4 and R5 correspond to an address alignment size of at least two, and single byte concurrency (i.e., block concurrency with a block size corresponding to a single byte). On the other hand, instructions shown in example 2 may commonly guarantee a quadword block concurrency if registers R4 and R5 have an address alignment size of at least quadword, and byte concurrency otherwise. Thus, a programmer or compiler converting instructions from example 1 to example 2 may lower the block concurrency guarantees of example 1 from halfword block concurrent to only byte concurrent for addresses which have an alignment address size of less than quadword, but at least halfword size. Therefore, a programmer or compiler may introduce a violation of programming language or programming conventions with this otherwise beneficial change.

As another example, if an array of 32 two-byte variables on a two-byte boundary is to be copied, it would take 32 halfword loads and 32 halfword stores to complete the copy. If a single instruction, multiple data (SIMD) load which loads 16-bytes at a time in accordance with some embodiments of this invention is used, only two loads and two stores are required, greatly reducing the execution time of the copy. When this SIMD load is implemented on a z/Architecture processor, the code in example 3 below may be replaced with two VECTOR LOAD instructions followed by two VECTOR STORE instructions as shown in example 4 below.

Example 3 shows a copy loop of 16 halfword loads and stores:

```
    LHI R1, 16
    XGR R3, R3
LOOP: LLH R2,0(R3,R4)
    STH R2,0(R3,R5)
    AGHI R3,2
    BCT R1,LOOP
```

This copy loop can be replaced with only two loads and two stores of vector registers, reducing the execution time from the time corresponding to executing 66 instructions to the time corresponding to executing four instructions as shown in example 4:

```
    VL V1, 0(R4)
    VST V1, 0(R5)
    VL V1, 16(R4)
    VST V1, 16(R5)
``` where VL is a VECTOR LOAD instruction, VST is a VECTOR STORE instruction, and V1 is a vector data type.

However, in accordance with conventional instructions architectures, example 3 that is based on copying 16 halfwords offers two byte block concurrency if the addresses held in registers R4 and R5 correspond to an address alignment size of at least two, and single byte concurrency. On the other hand, example 4 may commonly guarantee a quadword block concurrency if registers R4 and R5 have an address alignment size of at least quadword, and byte concurrency otherwise. Thus, a programmer or compiler converting the instructions from example 3 to example 4 may lower the block concurrency guarantees of example 3 from halfword block concurrent to only byte concurrent for addresses which have an alignment address size of less than quadword, but at least halfword size. Therefore, a programmer or compiler may introduce a violation of programming language or programming conventions with this otherwise beneficial change.

When multiple values of an array are to be incremented by a constant, similar transformations may be made. Specifically, example 5 below shows an addition loop of 16 halfwords:

```
    LHI R1, 16
    LH R7, R6
    XGR R3, R3
LOOP: LLH R2,0(R3,R4)
    AH R2, R6
```

STH R2,0(R3,R5)
AGHI R3,2
BCT R1,LOOP where LH is a LOAD HALFWORD instruction, AH is an ADD HALFWORD instruction, and R6 and R7 are registers. This addition loop of 16 halfwords can be replaced with only two vector additions, reducing the execution time from the time corresponding to executing 83 instructions to the time corresponding to executing 7 instructions as shown in the following example 6:

VLREPH V3, 0(R6)
VL V1, 0(R4)
VAH V1, V1, V3
VST V1, 0(R5)
VL V1, 16(R4)
VAH V1, V1, V3
VST V2, 16(R5)

where VLREPH is a VECTOR LOAD AND REPLICATE instruction, VAH is a VECTOR ADD HALFWORD instruction, and V1-V3 are vectors.

Example 5 provides block concurrency for each halfword being so incremented, if addresses R4 and R5 have an address alignment size of at least two, while example 6 offers block concurrency for groups of eight halfword being so incremented, if addresses R4 and R5 have an address alignment size of at least 16, and only byte concurrency otherwise. Thus, the transformation from example 5 to example 6 does not preserve block concurrency behavior of example 5.

It is to be noted that the vector instructions shown in examples 4 and 6 are not conventional memory reference instructions but are new instructions. However, these new vector instructions do not have the block concurrency behavior in accordance with some embodiments of the invention described herein.

The embodiments of the invention provide new definitions of memory reference instructions based on address alignment size for a specified memory address so that these instructions provide block concurrency for subblocks of a block size corresponding to the address alignment size aligned at that address alignment size. Hence, the above three code transformations (from example 1 to example 2, from example 3 to example 4, and from example 5 to example 6) may be performed on the basis of new, modified instruction definitions for load and store instructions. The modification corresponds to block concurrency behavior described herein while leaving the behavior of other aspects of instruction execution unmodified. For clarification, the opcodes of the following exemplary modified instructions are denoted with an "m" at the beginning of the operation code in the following examples of instructions.

A copy loop of halfword with halfword block concurrency may be performed with modified doubleword access instructions as shown in the following example 7:

LHI R1, 4
XGR R3, R3
LOOP: mLG R2,0(R3,R4)
mSTG R2,0(R3,R5)
AGHI R3,8
BCT R1,LOOP

In some embodiments, this code in example 7 offers two byte block concurrency if the addresses held in registers R4 and R5 correspond to an address alignment size of at least two, and single byte concurrency. In addition, in some embodiments, this code offers four byte block concurrency if the addresses held in registers R4 and R5 correspond to an address alignment size of at least four. In addition, in some embodiments, this code offers eight byte block concurrency if the addresses held in registers R4 and R5 correspond to an address alignment size of at least eight.

Similarly, the instructions of example 7 may be expressed using the Power ISA on the basis of modified Power ISA instruction definitions for load and store instructions. The modification corresponds to block concurrency behavior described herein while leaving the behavior of other aspects of instruction execution unmodified as specified by the Power ISA definition. Again, for clarification, the opcodes of these modified instructions being denoted with a "m" at the beginning of the operation code in the following instructions of example 7:

LI R1, 4
MTCTR R1
XOR R3, R3, R3
LOOP: mLDX R2, R3,R4
mSTDX R2, R3,R5
ADDI R3, R3, 8
BDNZ LOOP where LI is a Load Immediate instruction, MTCTR is a Move To Count Register instruction, XOR is an Exclusive OR instruction, LDX is a Load Double Word instruction, STDX is a Store Doubleword Indexed instruction, ADDI is an Add Immediate instruction, BDNZ is a Branch instruction, and R1-R5 are registers.

Further, the optimized instructions of example 4 may be transformed to the instructions of the following example 8. The optimized code may be performed with modified instructions as follows:

mVL V1, 0 (R4)
mVST V1, 0 (R5)
mVL V1, 16(R4)
mVST V1, 16(R5)

In some embodiments, this code of example 8 offers two byte block concurrency if the addresses held in registers R4 and R5 correspond to an address alignment size of at least two, and single byte concurrency (i.e., block concurrency with a block size corresponding to a single byte). In addition, in some embodiments, this code offers four byte block concurrency if the addresses held in registers R4 and R5 correspond to an address alignment size of at least four. In addition, in some embodiments, this code offers eight byte block concurrency if the addresses held in registers R4 and R5 correspond to an address alignment size of at least eight. In addition, in some embodiments, this code offers 16 byte block concurrency if the addresses held in registers R4 and R5 correspond to an address alignment size of at least 16, if a maximum block concurrency size for mVL and mVST is defined as at least 16 bytes. In some embodiments, this code offers eight byte block concurrency if the addresses held in registers R4 and R5 correspond to an address alignment size of at least 16, if a maximum block concurrency size for mVL and mVST is defined as at least eight bytes.

Similarly, the code of example 7 may be expressed using a modified Power ISA definition as the following example 8:

LI R1, 16
mLXVX V1, R0, R4
mSTXVX V1, R0, R5
mLXVX V1, R1, R4
mSTXVX V1, R1, R5

Similarly, example 6 can be expressed as the following example 9:

VLREPH V3, 0(R6)
mVL V1, 0(R4)
VAH V1, V1, V3
mVST V1, 0(R5)

mVL V1, 16(R4)
VAH V1, V1, V3
mVST V2, 16(R5)

In some embodiments, the code of example 9 offers two byte block concurrency if the addresses held in registers R4 and R5 correspond to an address alignment size of at least two, and single byte concurrency (i.e., block concurrency with a block size corresponding to a single byte). In addition, in some embodiments, this code offers four byte block concurrency if the addresses held in registers R4 and R5 correspond to an address alignment size of at least four. In addition, in some embodiments, this code offers eight byte block concurrency if the addresses held in registers R4 and R5 correspond to an address alignment size of at least eight. In addition, in some embodiments, this code offers 16 byte block concurrency if the addresses held in registers R4 and R5 correspond to an address alignment size of at least 16, if a maximum block concurrency size for mVL and mVST is defined as at least 16 bytes. In some embodiments, this code offers eight byte block concurrency if the addresses held in registers R4 and R5 correspond to an address alignment size of at least 16, if a maximum block concurrency size for mVL and mVST is defined as at least eight bytes.

In some embodiments, existing instructions and opcodes are modified, and no new mnemonics for the instructions are introduced. In other embodiments, new instructions and opcodes are introduced with the teachings of block concurrency based on address alignment size described herein.

Figure 3:
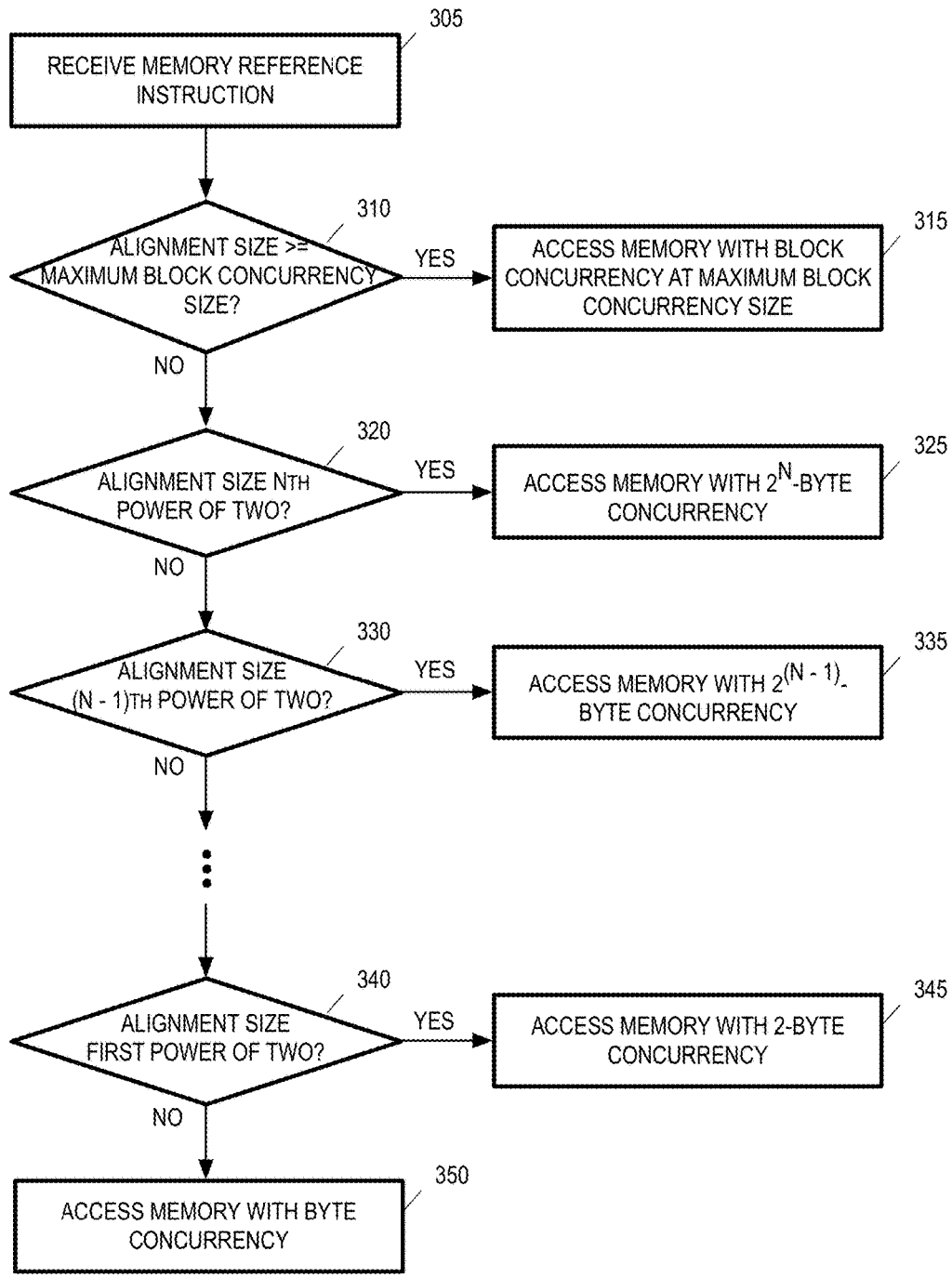
FIG. 3 depicts a process flow for accessing a memory in accordance with some embodiments of the invention.

FIG. 3 depicts a process flow for accessing a memory in accordance with some embodiments of the invention. In some embodiments, a processor (e.g., a CPU), performs the process flow shown in FIG. 3. At box 305, the processor receives a memory reference instruction that references a block of data at an address of a memory. The memory reference instruction includes any instruction that references a block of data in the memory (e.g., an instruction that includes an address in a memory as an operand). Such instructions include load instructions and store instructions as well as instructions for arithmetic operations (e.g., add instructions, subtract instructions, compare instructions, etc.).

At decision box 310, the processor optionally determines whether the memory, from which the processor references data, has a memory address boundary (i.e., an address alignment size of the address specified in the memory reference instruction) larger than or equal to the maximum block concurrent memory reference size (or, the maximum block concurrency size) supported by the memory reference instruction received at box 305. The maximum memory reference size for an instruction is defined for all instructions of an instruction set architecture. The maximum block concurrent memory reference size may be the size of the memory reference of the instruction or may correspond to a maximum block concurrent reference size defined for all instructions of the instruction set architecture. In some embodiments, the maximum block concurrent memory reference size may be the size of the memory reference of the instruction or may correspond to a maximum block concurrent memory reference size defined independently for each instruction of the instruction set architecture.

In response to determining at decision box 310 that the memory address boundary is not larger than or equal to the maximum block concurrent memory reference size, the processor proceeds to decision box 320, which will be described further below. In response to determining at decision box 310 that the memory address boundary is larger than or equal to the maximum block concurrent memory reference size, the processor proceeds to box 315 to access the memory with block concurrency at the maximum block concurrent memory reference size. For example, when the memory reference size is 32 bytes and the memory address boundary is 16 bytes but the maximum block concurrent memory reference size is eight bytes, the processor accesses the memory with eight-byte concurrency.

At decision box 320, the processor determines whether the alignment size of the requested memory address is the Nth power of two (i.e., $2^N$), where N is the largest nonnegative integer that makes $2^N$ smaller than or equal to the memory reference size. For example, when the memory reference size is 36 bytes, the processor at decision box 320 determines whether the requested memory address has an alignment size of 32 bytes ($2^5$ bytes). In response to determining that the requested memory address alignment size is the Nth power of two, the processor proceeds to box 325 to access the memory with $2^N$ byte concurrency. For example, the processor block concurrently accesses the memory 32 bytes together to access all 32 bytes if the memory address alignment size is 32 bytes and the memory reference size is 32 bytes. In response to determining that the requested memory address alignment is not the Nth power of two, the processor proceeds to box 330. As described above, a maximum block concurrent memory reference size may be set for one or more instructions. In some embodiments, N is set to the largest nonnegative integer that makes $2^N$ smaller than or equal to the maximum block concurrent memory reference size, regardless of the memory reference size. For example, an instruction may provide a maximum block concurrent memory reference size of eight bytes. Then, N is set to three even if the memory reference size is greater than $2^3$.

At decision box 330, the processor determines whether the requested memory address alignment size is the (N−1)th power of two (i.e., $2^{(N-1)}$). For example, when the memory reference size is 32 bytes ($2^5$ bytes), the processor at box 330 determines whether the requested memory address alignment size is 16 bytes ($2^4$ bytes). In response to determining that the requested memory address alignment size is the (N−1)th power of two, the processor proceeds to box 335 to access the memory with $2^{(N-1)}$-byte concurrency. For example, the processor block concurrently accesses the memory 16 bytes ($2^4$ bytes) at a time to access all 32 bytes if the memory reference size is 32 bytes ($2^5$ bytes).

In response to determining that the requested memory address alignment size is not the (N−1)th power of two, the processor proceeds to decision box 340 in a similar manner until the requested memory address alignment size is determined at decision box 340 to be the first power of two (i.e., $2^1$ bytes). In response to determining that the requested memory address alignment size is two, the processor proceeds to box 345 to access the memory with two-byte concurrency. For example, the processor block concurrently accesses the memory two bytes at a time to access all 32 bytes if the memory reference size is 32 bytes. In response to determining at decision box 340 that the requested memory address alignment size is not two, the processor proceeds to box 350 to access the memory with one-byte concurrency. That is, the processor accesses one byte at a time to access all bytes specified by the memory reference instruction.

It is to be recognized that, at the boxes 320 through 350, the processor accesses the memory with block concurrency at the requested memory address alignment size when the requested memory address alignment size is smaller than the memory reference size of the memory reference instruction.

That is, in some embodiments, the processor executing the memory reference instruction acts as if the access is block concurrent to whatever boundary to which the address of the requested block of data is aligned (i.e., access is block concurrent at any alignment size).

In some embodiments, the memory reference size of the memory reference instruction is implied by e.g. the opcode (operation code) of the instruction. This is because the opcode of instruction indicates a data type of the data being referenced as well as an operation to perform. Alternatively or conjunctively, in some embodiments, a memory reference instruction may be defined to specify the memory reference size explicitly, e.g., in an operand of the instruction. For instance, the operand of the instruction specifies the highest indexed byte to fetch or store. This allows a programmer to specify the memory reference size. In some cases, a specified memory reference size may not be a power of two (e.g., 10 bytes) and may not match to the opcode-implied memory reference size.

The embodiments of the invention provide systems and methods that provide block concurrency when the specified memory reference size is not the same as the address boundary of the requested memory. In some embodiments, when the memory reference size is specified in a memory reference instruction, the processor that executes the instruction uses the greatest common divisor of the address boundary of the requested address of the memory and the specified memory reference size as the block concurrent data access size. For example, if the operand address of the instruction is on a four-byte boundary and the specified memory reference size is 10 bytes, the data accesses appear to be at least two-byte concurrent to other processors because two is the greatest common divisor of 10 and four. This allows for data-parallel code that behaves the same way as a scalar code and does not break any programming language semantics or conventions.

In some embodiments, block size of block concurrency (i.e., the level of block concurrency—e.g., 2-byte concurrency, 4-byte concurrency, 16-byte concurrency, 32-concurrency) is directly derived from the address alignment size. In other embodiments, the block concurrency size of a block concurrent access is based on both the address alignment size and the memory reference size of an instruction. In some such embodiments, the block size for a block concurrent access is the minimum of the block size of block concurrency that is directly derived from the address alignment and the size of the memory reference. In yet other embodiments, the block size for a block concurrent access is determined by the largest power of two block size in common between the address alignment size and the memory reference size, as further shown in FIG. 4.

Figure 4:
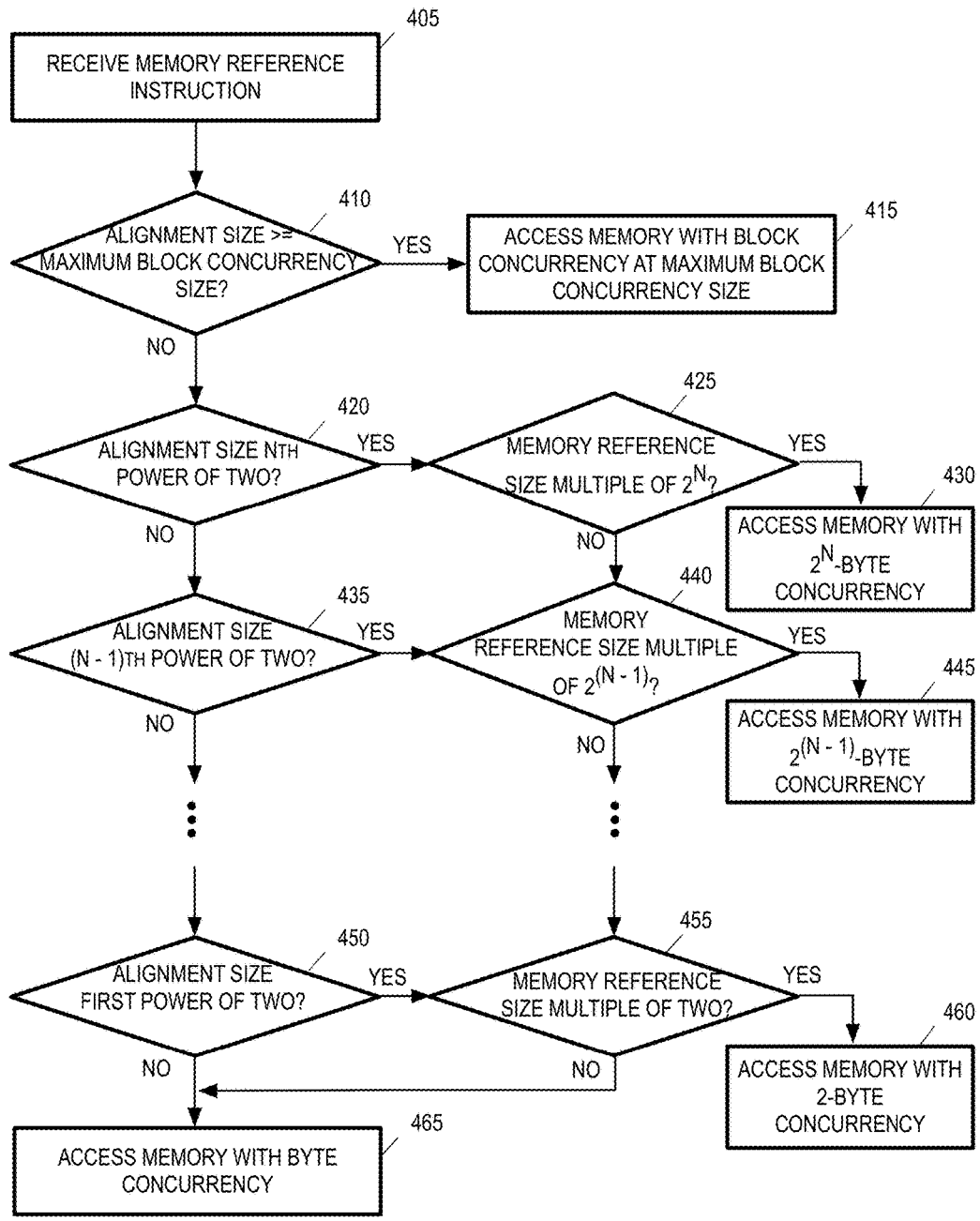
FIG. 4 depicts a process flow for accessing a memory in accordance with some embodiments of the invention.

FIG. 4 depicts a process flow for accessing memory when the block size of block concurrent access is based on both the address alignment size and the memory reference size of a memory reference instruction. In some embodiments, the maximum block size of a block concurrent access may be imposed to all instruction by an instruction set architecture or to specific instructions that have maximum block concurrency sizes. Some memory reference instructions explicitly specify a memory reference size, and which may not be a power of two. However, some implementations may allow only the power-of-two block concurrency sizes. In some such embodiments, a processor (e.g., a CPU), performs the process flow shown in FIG. 4.

At box 405, the processor receives a memory reference instruction that references a block of data at an address of a memory. This memory reference instruction also specifies the size of data to reference, e.g., in an operand of the instruction.

At decision box 410, the processor optionally determines whether the memory, from which the processor references data, has a memory address alignment size larger than or equal to the maximum block concurrent memory reference size of the memory reference instruction received at box 405. In response to determining that the memory address alignment size is not larger than or equal to the maximum block concurrent memory reference size, the processor proceeds to decision box 420, which will be described further below. In response to determining that the memory address alignment size is larger than or equal to the specified memory reference size, the processor proceeds to box 415 to access the memory with block concurrency at the maximum block concurrent memory reference size. For example, when the specified memory reference size is eight bytes and the memory address alignment size is eight bytes, but the maximum block concurrent access size is 4-bytes, the processor accesses the memory with four-byte concurrency.

At decision box 420, the processor determines whether the requested memory address alignment size is the Nth power of two (i.e., $2^N$), where N is the largest non-negative integer that makes $2^N$ smaller than or equal to the specified memory reference size. For example, when the specified memory reference size is ten bytes, the processor at box 415 determines whether the requested memory address is aligned to eight ($2^3$) bytes. In response to determining at decision box 420 that the requested memory address alignment size is not the Nth power of two, the processor proceeds to decision box 435, which will be described further below.

In response to determining at decision box 420 that the requested memory address alignment size is the Nth power of two, the processor proceeds to decision box 425 to determine whether the specified memory reference size is a multiple of the Nth power of two. For example, when the specified memory reference size is ten bytes, the processor at decision box 425 determines whether the specified memory reference size ten is a multiple of eight bytes. If the specified memory reference size is not a multiple of the Nth power of two, the processor proceeds to decision box 440, which will be described further below. If the specified memory reference size is the Nth power of two, the processor proceeds to box 430 to access the memory with $2^N$-byte concurrency.

At decision box 435, the processor determines whether the requested memory address alignment size is the (N−1)th power of two (i.e., $2^{(N-1)}$). For example, when the memory reference size is ten bytes, the processor at decision box 435 determines whether the requested memory address alignment size is four bytes (i.e., $2^2$ bytes). In response to determining that the requested memory address alignment size is not the (N−1)th power of two, the processor proceeds towards decision box 450, which will be described further below.

In response to determining at decision box 435 that the requested memory address alignment size is the (N−1)th power of two, the processor proceeds to decision box 440 to determine whether the specified memory reference size is a multiple of the (N−1)th power of two. For example, when the specified memory reference size is ten bytes, the processor at decision box 440 determines whether the specified memory reference size ten is a multiple of four bytes ($2^2$ bytes). If the specified memory reference size is not a multiple of the (N−1)th power of two, the processor proceeds towards decision box 455, which will be described further below. If the specified memory reference size is the (N−1)th power of two, the processor proceeds to box 445 to access the memory with $2^{(N-1)}$-byte concurrency.

In response to determining at decision box 435 that the requested memory address alignment size is not the (N−1)th power of two, the processor proceeds towards box 450 in a similar manner until the requested memory address alignment size is determined at box 450 to be the first power of two ($2^1$). In response to determining at decision box 450 that the requested memory address alignment size is not two, the processor at box 465 accesses the memory with one-byte concurrency. That is, the processor accesses one byte at a time to access all bytes specified by the memory reference instruction.

In response to determining at decision box 450 that the requested memory address alignment size is two, the processor proceeds to decision box 455 to determine whether the specified memory reference size is a multiple of two bytes. If the specified memory reference size is not a multiple of two, the processor proceeds to box 465 to access the memory with one-byte concurrency. If the specified memory reference size is a multiple of two, the processor proceeds to box 460 to access the memory with two-byte concurrency. For example, the processor accesses the memory two bytes at a time to access all ten bytes if the memory reference size is ten bytes.

It is to be recognized that, at boxes 420 through 465, the processor identifies the greatest common divisor of the requested memory address alignment size and the specified memory reference size in number of bytes and accesses the memory with block concurrency at the greatest common divisor. For example, when the specified memory reference size is ten bytes and the requested memory address alignment size is four bytes, the processor identifies the greatest common divisor, two bytes, and accesses the memory with two-byte concurrency (i.e., accesses all ten bytes by block concurrently accessing two bytes at a time).

In some embodiments, a maximum block concurrency size may be set for one or more instructions. For example, an instruction may provide a maximum block concurrency size of eight bytes. Then, N is set to three at decision box 420 even if the specified memory reference size is greater than $2^3$. In some embodiments, a maximum block concurrency size applies to all instructions. In other embodiments, each instruction can have a separate maximum block concurrency size.

Figure 5:
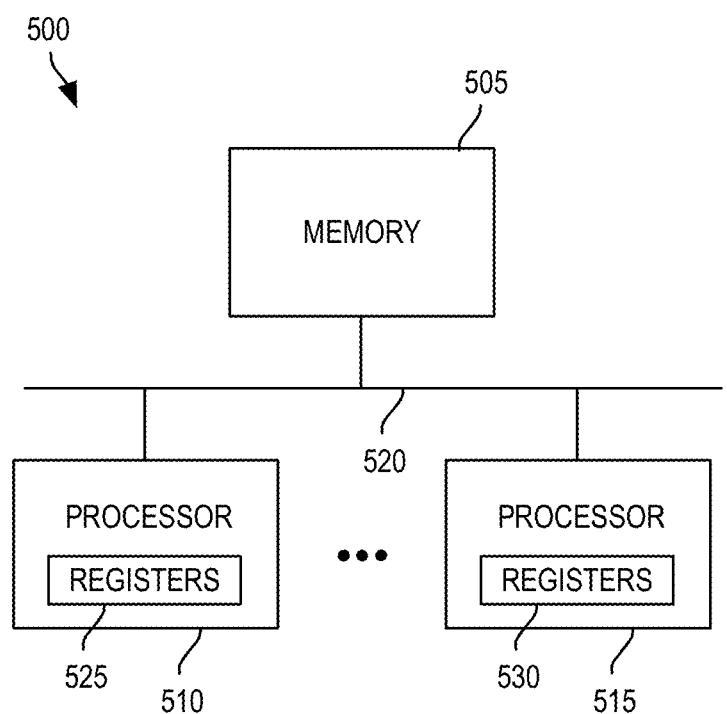
FIG. 5 illustrates a system for accessing data in a memory according to some embodiments of the invention.

FIG. 5 illustrates a system 500 for accessing data in a memory according to some embodiments of the invention. Specifically, this figure illustrates that the system 500 includes a memory 505 and a plurality of processors 510 and 515, among other components that are not depicted for simplicity of illustration and description. The memory 505 and processors 510 and 515 are coupled to one another via one or more buses 520. The processors 510 and 515 are shown to have registers 525 and 530, respectively, but the other components within the processors (e.g., arithmetic logic units, control units, clocks, internal bus, etc.) are not depicted for simplicity of illustration and description).

In some embodiments, the system 500 represents various parallel processing environments. For example, one of the processors 510 and 515 may be a vector processor that executes vectorized instructions. One of the other processors may be a scalar processor that executes scalar instructions. The vector processor and the scalar processor may share the memory 505. As another example, the system 500 may represent a multicore processor, where the processors 510 and 515 are different cores sharing the memory 505. As yet another example, the system 500 may represent a mainframe computer system having the processors 510 and 515 that process in parallel.

As known in the art, a processor or a processor family (such as 8086 and the x86-family or those of the IBM System z server family) has its own set of machine instructions. For example, the instruction set of the IBM System z server family, known as the z/Architecture instruction set, is set forth in the above-incorporated *z/Architecture Principles of Operation*, and the instruction set of Power Servers, known as the Power ISA (instruction set architecture), is set forth in the above-incorporated *Power ISA*. Machine instructions are patterns of bits that by design correspond to different commands to the machine. In most cases, the instruction set is specific to a class of processors using the same architecture. Most instructions have one or more opcodes which specify the basic instruction type (such as arithmetic, memory reference, branch, etc.) and the actual operation (such as load, store, add or compare) and other fields that may give the type of the operand(s), the addressing mode(s), the addressing offset(s) or index, or the actual value itself. That is, each machine instruction is for performing a very specific task, such as a load, a branch, or an arithmetic logic unit (ALU) operation on a unit of data in registers or memory. Some of these machine instructions are memory reference instructions, which reference data at specific addresses in the memory 505 to fetch or store the data from or to the memory 530 to or from the registers.

The processors 510 and 515 may be configured to execute memory reference instructions that provide block concurrency even if the address of a block of data within the memory 505 is not integral to the memory reference size for the memory reference instruction. That is, in some embodiments, the memory reference instructions for the processors 510 and 515 will act as if the instructions are block concurrent to whatever boundary to which the block of data being referenced is aligned. In some embodiments, there is a maximum of eight-byte concurrency. In some embodiments, the processors identify the greatest common divisor of the memory address alignment size and the specified memory reference size in number of bytes and access the memory 505 with block concurrency at the greatest common divisor. Thus, the functioning of a computer including the processors 510 and 515 may be improved.

Different embodiments configure the processors 510 and 515 differently. For instance, in some embodiments, the processors 510 and 515 may be configured by providing new definitions to existing conventional memory reference instructions so that the processors 510 and 515, when executing the instructions, access the memory 505 in accordance with the various embodiments of the invention. Alternatively or conjunctively, the processors 510 and 515 may be configured by defining new memory reference instructions that access the memory 505 in accordance with the various embodiments of the invention.

For instance, a memory reference instruction includes a vector load instruction, which often has 16-byte alignment requirement. That is, a vector load instruction with 16-byte alignment requirement is expected to load all 16 bytes of a 16-byte block of data as a single unit from the memory. When a multi-threaded code is vectorized by a compiler to, e.g., allow for data-parallel executions, it is assumed that if one variable is updated by a first CPU and read by a second CPU, the second CPU will see the whole change to the variable, and never mixed results. Block currency cannot be guaranteed with conventional vector load instruction definitions. Therefore, it is often hard to use greater degrees of data parallelism when also using thread parallelism. This limits potential software performance and causes hardware not to be fully utilized.

By configuring the processors to access the memory in accordance with various embodiments of the invention, the processors can use greater degrees of data parallelism when using thread parallelism without requiring external serialization (e.g., a lock). The processors configured in accordance with the embodiments of the invention also improve software performance and facilitate utilization of hardware. The embodiments of the invention allow for smaller data types to be packed into a vector and to appear to other processors to operate with the same semantics as if scalar instructions were being used. Moreover, block concurrency allows easier auto-parallelization of code by compilers by avoiding extra alignment restrictions and the need for extra code to handle portions of data that may not be aligned.

In some embodiments of the invention, a method for accessing data in a memory coupled to a processor is provided. The method receives a memory reference instruction for accessing data of a first size at an address in the memory. The method determines an alignment size of the address. The method accesses the data of the first size in one or more groups of data by accessing each group of data block concurrently. The groups of data have sizes that are multiples of the alignment size. The method determines the alignment size by counting a number of trailing zeros in the address in binary representation. Each group of data is not larger than a predefined maximum block concurrency size in bytes. In some embodiments, the first size is larger than the determined alignment size. In some embodiments, the first size and the determined alignment size are in number of bytes, where the first size is $2^A$ and the determined alignment size is $2^B$, wherein A is an integer greater than B, which is a nonnegative integer. In some embodiments, the method determines the first size based on an opcode of the memory reference instruction. In some embodiments, the processor comprises a vector processor, and the memory reference instruction comprises a vector instruction.

In some embodiments of the invention, a method for accessing data in a memory coupled to a processor is provided. The method receives a memory reference instruction for accessing data of a first size at an address in the memory. The memory reference instruction specifies the first size. The method determines an alignment size of the address. The method determines a greatest common divisor of the first size and the determined alignment size. The method accesses the data of the first size in one or more groups of data. The groups of data have sizes that are multiples of a size of the greatest common divisor. In some embodiments, the first size is larger than the determined alignment size. In some embodiments, the first size and the determined alignment size are in number of bytes, where the first size is not a power of two size and the determined alignment size is a power of two size. In some embodiments, the method determines the first size based on an operand of the memory reference instruction. In some embodiments, the processor comprises a vector processor, and the memory reference instruction comprises a vector instruction.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for accessing data, comprising:
   a memory; and
   a processor configured to perform a method comprising:
      receiving a memory reference instruction for accessing data of a first size at an address in the memory;
      determining an alignment size of the address, wherein the determining the alignment size comprises counting a number of trailing zeros in the address in binary representation;
      determining a greatest common divisor of the first size and the alignment size; and
      accessing the data of the first size in one or more groups of data by accessing each group of data block concurrently, the groups of data having sizes that are multiples of the greatest common divisor.

2. The system of claim 1, wherein the first size and the determined alignment size are in number of bytes, wherein the first size is $2^A$ and the determined alignment size is $2^B$, wherein A is an integer greater than B, which is a nonnegative integer.

3. The system of claim 1, wherein each group of data is not larger than a predefined maximum block concurrency size.

4. The system of claim 1, wherein the processor comprises a vector processor, and the memory reference instruction comprises a vector instruction.

5. A computer program product for accessing data, the computer program product comprising:
   a computer readable storage medium having machine instructions embodied therewith, the machine instructions readable by a processor to cause the processor to perform a method comprising:
      receiving a memory reference instruction for accessing data of a first size at an address in the memory;
      determining an alignment size of the address, wherein the determining the alignment size comprises counting a number of trailing zeros in the address in binary representation;
      determining a greatest common divisor of the first size and the alignment size; and
      accessing the data of the first size in one or more groups of data by accessing each group of data block concurrently, the groups of data having sizes that are multiples of the greatest common divisor.

6. The computer program product of claim 5, wherein the first size is larger than the determined alignment size.

7. The computer program product of claim 5, wherein each group of data is not larger than a predefined maximum block concurrency size.

8. The computer program product of claim 5, wherein the method further comprises determining the first size based on an opcode of the memory reference instruction.

9. The system of claim 1, wherein counting the number of trailing zeros in the address in binary representation further comprises raising two to a power of the number of trailing zeros in binary representation.

* * * * *